United States Patent
Brownell et al.

(10) Patent No.: US 9,511,661 B2
(45) Date of Patent: Dec. 6, 2016

(54) DRIVEN WHEEL UNIT INCLUDING AN AXIALLY COMPACT TWO-SPEED PLANETARY GEAR DRIVE ASSEMBLY

(71) Applicant: Deere & Company, Moline, IL (US)

(72) Inventors: Douglas K. Brownell, Independence, KS (US); Eric Vilar, Dubuque, IA (US); Kyle K. McKinzie, Altamont, KS (US); Reginald M. Bindl, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 95 days.

(21) Appl. No.: 14/645,776

(22) Filed: Mar. 12, 2015

(65) Prior Publication Data

US 2016/0263987 A1    Sep. 15, 2016

(51) Int. Cl.
| | |
|---|---|
| *F16H 48/06* | (2006.01) |
| *B60K 7/00* | (2006.01) |
| *F16H 3/62* | (2006.01) |
| *F16H 61/02* | (2006.01) |
| *B60K 17/08* | (2006.01) |
| *B60K 17/02* | (2006.01) |
| *B60B 27/00* | (2006.01) |
| *F16D 25/10* | (2006.01) |
| *F16D 25/0638* | (2006.01) |

(52) U.S. Cl.
CPC ......... *B60K 7/0007* (2013.01); *B60B 27/0015* (2013.01); *B60K 17/02* (2013.01); *B60K 17/08* (2013.01); *F16D 25/0638* (2013.01); *F16D 25/10* (2013.01); *F16H 3/62* (2013.01); *F16H 61/0265* (2013.01); *F16H 2200/0034* (2013.01); *F16H 2200/201* (2013.01); *F16H 2200/2033* (2013.01)

(58) Field of Classification Search
None
See application file for complete search history.

(56) References Cited

U.S. PATENT DOCUMENTS

| | | | |
|---|---|---|---|
| 2,919,778 | A | 1/1960 | Aschauer |
| 3,115,204 | A | 12/1963 | Dence |
| 3,458,005 | A | 7/1969 | Kainer et al. |

(Continued)

OTHER PUBLICATIONS

Bearing Selection and Loads. FSAE.com, pp. 1-11 [online], [retrieved on May 27, 2015]. Retrieved from the Internet <URL: http://www.fsae.com/forums/showthread.php?11598-Bearing-Selection-and-Loads>.

*Primary Examiner* — Dirk Wright

(57) ABSTRACT

A driven wheel unit includes an electric motor coupled to a two-speed, three stage planetary drive assembly and has a width dimensioned for traveling between rows of crop. A wheel hub is supported on an outer surface of a fixed housing by large diameter wheel bearings surrounding both a motor-containing cavity and an adjacent cavity containing first and second planetary stages. Nested radially and surrounding the two planetary stages are two SAHR disc clutches including pistons engaging inner and outer surfaces of a compact piston guide member. The third stage planet carrier defines a cap and is fixed to an axially outer end of the wheel hub. A third stage ring gear has an outside diameter approximately equal to that of the wheel bearings and has an inside diameter fixed to the housing by a planar, annular wheel bearing retainer plate that is fixed to an end of the housing.

17 Claims, 6 Drawing Sheets

(56) References Cited

U.S. PATENT DOCUMENTS

| | | |
|---|---|---|
| 4,330,045 A | 5/1982 | Myers |
| 4,856,377 A | 8/1989 | Goudreau et al. |
| 4,920,828 A | 5/1990 | Kameda et al. |
| 5,006,100 A | 4/1991 | Brandt et al. |
| 5,478,290 A | 12/1995 | Buuck et al. |
| 5,489,013 A | 2/1996 | Buuck et al. |
| 5,538,121 A | 7/1996 | Hering |
| 5,691,584 A * | 11/1997 | Toida ............... H02K 1/185 180/65.51 |
| 6,590,306 B2 | 7/2003 | Terada |
| 6,852,061 B2 | 2/2005 | Schoon |
| 7,182,708 B2 | 2/2007 | Winzeler |
| 7,315,099 B2 * | 1/2008 | Steffen .............. B60K 7/0007 180/65.51 |
| 7,445,108 B2 | 11/2008 | Bauer et al. |
| 7,527,113 B2 * | 5/2009 | Jenkins ............. B60K 7/0007 180/308 |
| 7,604,561 B2 | 10/2009 | Earhart |
| 7,932,652 B2 * | 4/2011 | DeVeny ............. B60K 7/0007 180/65.51 |
| 8,133,143 B2 | 3/2012 | Schoon |
| 8,316,973 B2 * | 11/2012 | Walter ............... B60K 7/0007 180/65.51 |
| 8,323,143 B2 | 12/2012 | Schoon |
| 8,413,779 B2 | 4/2013 | Fronius et al. |
| 8,449,424 B2 | 5/2013 | Schoon |
| 8,616,087 B2 | 12/2013 | Sayama |
| 8,727,933 B2 | 5/2014 | Enderle et al. |
| 8,746,385 B2 * | 6/2014 | Wargh ............... B60K 7/0007 180/65.51 |
| 8,758,181 B2 | 6/2014 | Calvert |
| 2007/0209853 A1 * | 9/2007 | Nakajima ........... B60K 7/0007 180/65.51 |
| 2009/0000840 A1 * | 1/2009 | Murata .............. B60K 7/0007 180/65.51 |
| 2013/0062466 A1 * | 3/2013 | Sweet ............... B64C 25/405 244/103 R |
| 2014/0139009 A1 | 5/2014 | Bindl et al. |

* cited by examiner

DRIVEN WHEEL UNIT INCLUDING AN AXIALLY COMPACT TWO-SPEED PLANETARY GEAR DRIVE ASSEMBLY

FIELD OF THE DISCLOSURE

The present disclosure relates to a driven wheel unit including a two-speed planetary gear drive assembly, and more specifically relates to such a driven wheel unit that includes multiple speed reduction planetary stages and is particularly suited for use on a row-crop tractor or sprayer intended to be easily driven between rows of crop having a spacing of about 20 inches (508 mm) without running over the crop.

BACKGROUND

A planetary drive arrangement is often used in a vehicle driven wheel unit for providing high and low operating speeds as well as stepped speed reductions effected by routing power delivered by drive unit motors (hydrostatic or electric, for example) through multiple planetary gear stages. While those familiar with powered wheel units have long appreciated the severe limitations that such designs place upon available space in which to locate the drive motor and constituent components of the planetary gear arrangements of such wheel units, they will agree that these space constraints are even more severe when the wheel units are being used to drive wheels of a row-crop tractor intended for being driven between rows of crop planted as close as 20 inches (508 mm) apart and when the wheel units are powered by an electric motor. In this particular usage of a drive unit, it is important for the drive unit to be axially compact, while maintaining desired torque output and reliability in view of the ever increasing size of implements being drawn or carried by the tractor. Therefore, what is needed is a driven wheel unit especially designed for use with a row-crop tractor to be driven between rows of crop spaced apart as narrow as 20 inches (508 mm).

SUMMARY

According to a first aspect of the present disclosure, there is provided a driven wheel unit of a row crop tractor, with the driven wheel unit comprising a two-speed planetary drive assembly including at least two planetary stages located within a fixed housing, with the fixed housing having a cylindrical outer surface on which is mounted a main support bearing assembly supporting a wheel hub for rotation, with the drive assembly including radially outer and inner friction clutches located radially within a diameter of the main support bearing assembly and being arranged in a compact, radially nested fashion so as to occupy a minimum of axial width.

According to a second aspect of the disclosure, the aforementioned inner and outer disc clutches are each spring applied hydraulically released (SAHR) friction clutches which each include an annular piston, and a compact annular piston support and guide member fixed to the fixed housing and having radially outer surfaces engaged by the outer SAHR friction clutch and having radially inner surfaces engaged by the inner SAHR friction clutch.

According to a third aspect of the disclosure, the annular friction clutches are each L-shaped in cross section, with the legs of the radially outer SAHR friction clutch cooperating with the annular piston guide and support member to define a first annular working fluid cavity adapted for selectively receiving pressurized fluid for disengaging the radially outer SAHR friction clutch, and with the legs of the radially inner SAHR friction clutch cooperating with the annular piston guide and support member to define a second annular working fluid cavity adapted for selectively receiving pressurized fluid for disengaging the radially inner SAHR friction clutch.

According to a fourth aspect of the disclosure, the inner and outer SAHR friction clutches are in an annular arrangement surrounding the entire first planetary stage and surrounding the second stage sun and planet carrier and with an outer clutch disc pack being coupled between an outer annular surface of the second stage ring gear and the fixed housing, and with an inner clutch disc pack being coupled between an inner annular surface of the second stage ring gear and an outer annular surface of the second stage planet carrier.

According to a fifth aspect of the disclosure, a planar annular retainer plate is releasably fixed to an annular, axially outward facing end surface of the fixed housing and engages and retains a first bearing of the main support bearing assembly in place on the housing, the retainer plate having a toothed outer diameter engaged with, and directly fixing, a third stage ring gear to the fixed housing.

According to a sixth aspect of the present disclosure, a floating face seal assembly is located on the outer cylindrical surface of the fixed housing at an opposite side of the main support bearing assembly from the retainer plate and, in addition to acting to seal a clearance gap existing at an interface between the hub and the fixed housing, the face seal assembly is in biasing engagement with a second bearing of the main support wheel bearing arrangement and acts to retain the second bearing in place on the housing.

According to a seventh aspect of the disclosure, the planetary gear arrangement includes three stages with first, second and third stage sun gears being located serially in end-to-end relationship to each other along an axis of rotation of the wheel unit and with each sun gear being mounted for rotation relative to each other sun gear.

These and other aspects of the disclosure will become apparent from a reading of the ensuing description together with the appended drawings.

DETAILED DESCRIPTION

Figure 1:
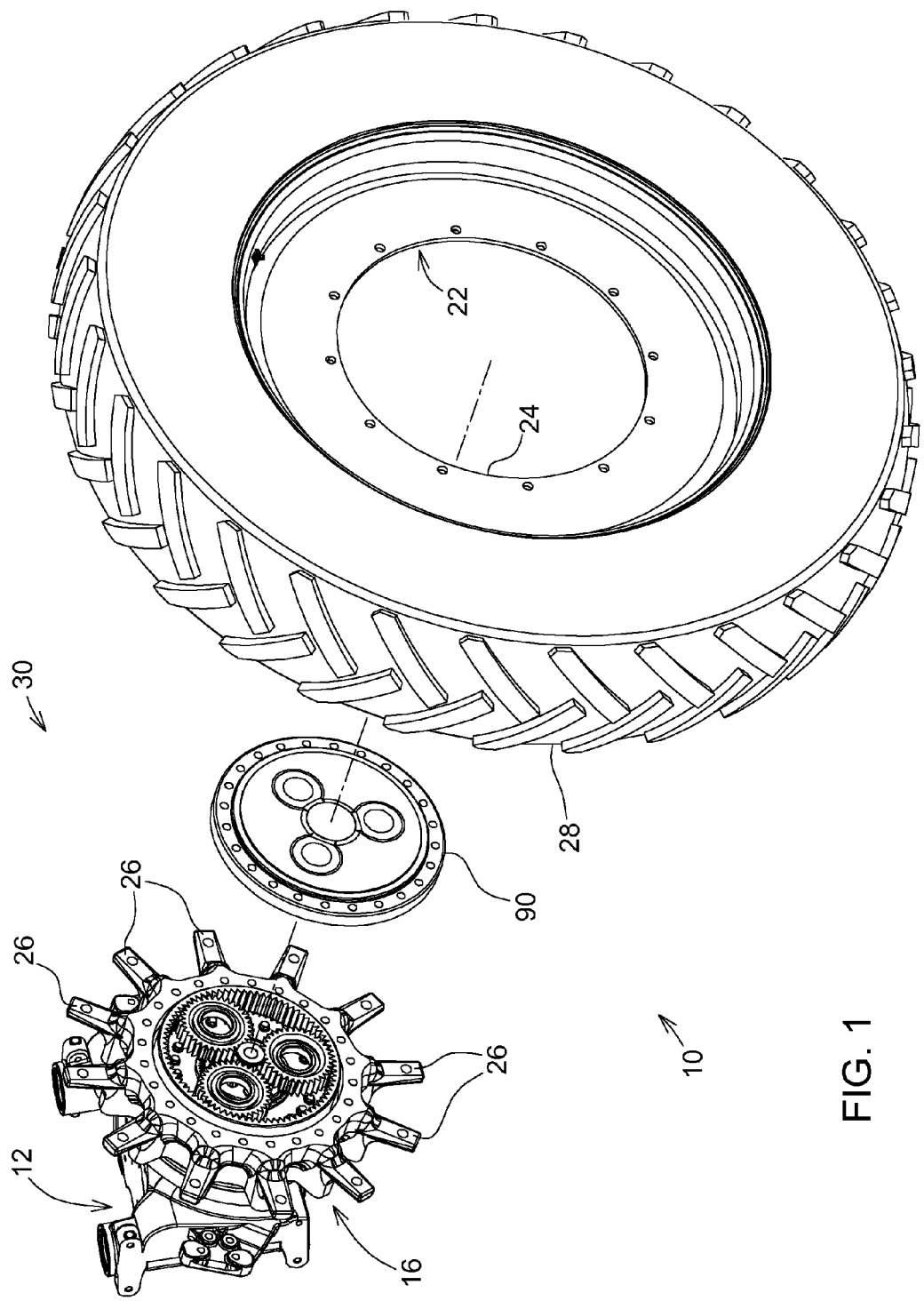
FIG. 1 is a partial exploded view showing a wheel drive unit constructed in accordance with the principles of the present disclosure.
Figure 2:
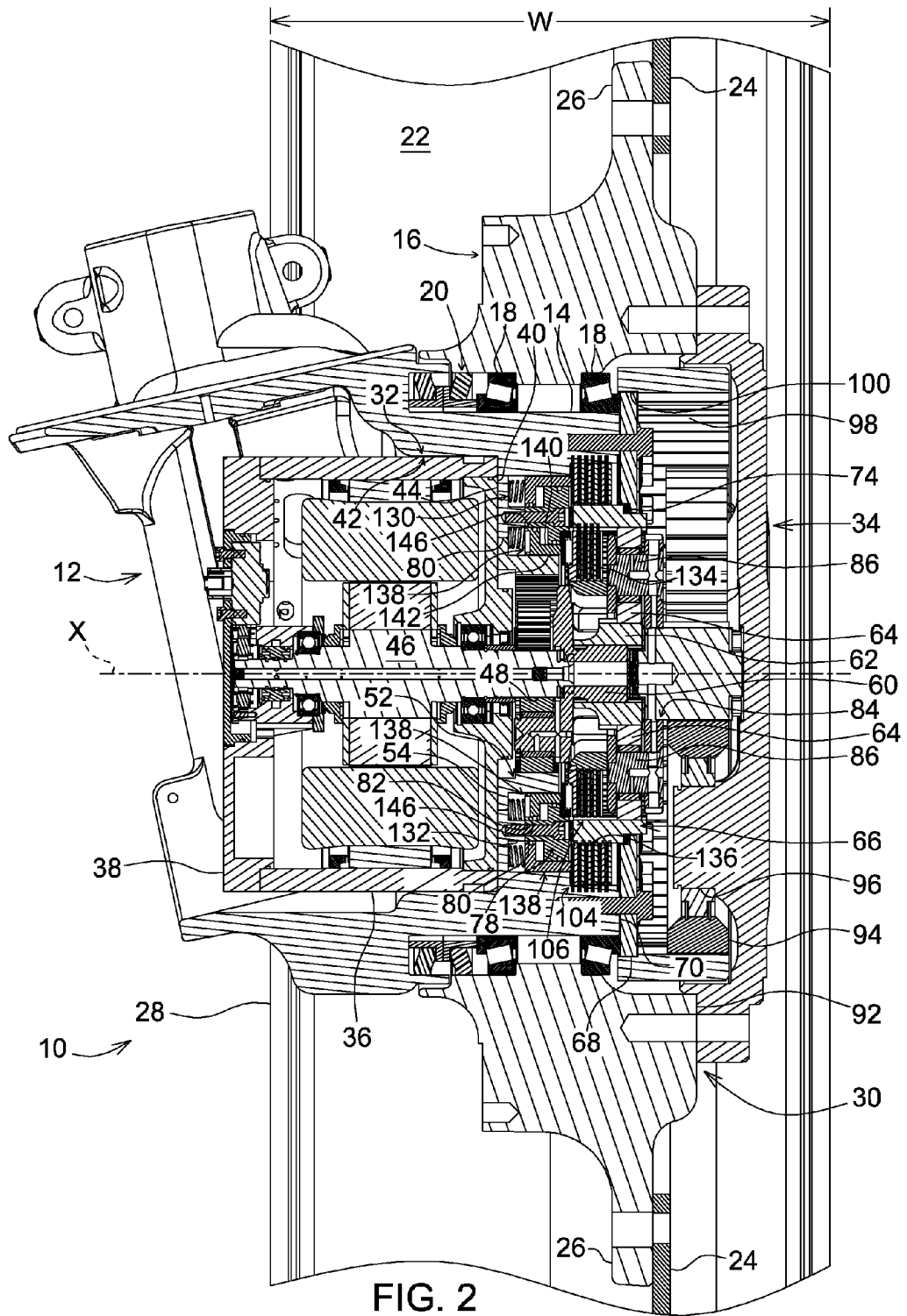
FIG. 2 is a vertical sectional view taken through the drive wheel unit of FIG. 1.

Referring now to FIGS. 1 and 2, there is shown an exemplary embodiment of a drive wheel unit 10 including a fixed housing 12, with an axially outer end section of the housing having a radially outer cylindrical surface 14 disposed concentrically relative to an axis of rotation X. An annular wheel hub 16 is supported on the cylindrical surface 14 for rotating about the axis of rotation X by a main wheel support bearing assembly including a pair of axially spaced roller thrust bearings 18. Located in an annular cavity defined by, and extending between, an inner annular wall of the rim 16 and an outer annular wall 14 of the fixed housing 12 is an annular metal face seal assembly 20 that, as viewed in FIG. 2, is located immediately leftward of the left roller thrust bearing 18. The face seal assembly 20 is positioned against a left surface of the left thrust bearing 18 and keeps an outer race of the latter positioned against a shoulder defined by the inner surface of the wheel hub 16.

A wheel rim 22 includes an annular, radially inward extending mounting plate 24 joined at a right angle to an interior surface of the wheel rim 20 and respectively secured to a plurality of radially outward projecting spokes 26 of the hub 16 by a plurality of fasteners (not shown). A tire 28 is mounted on the rim 20 and has a width W of approximately 16.75 inches (425 mm) which is suitable for traveling between rows of agricultural plants, spaced as narrow as 20 inches (508 mm) from each other, without running over the plants.

Figure 3:
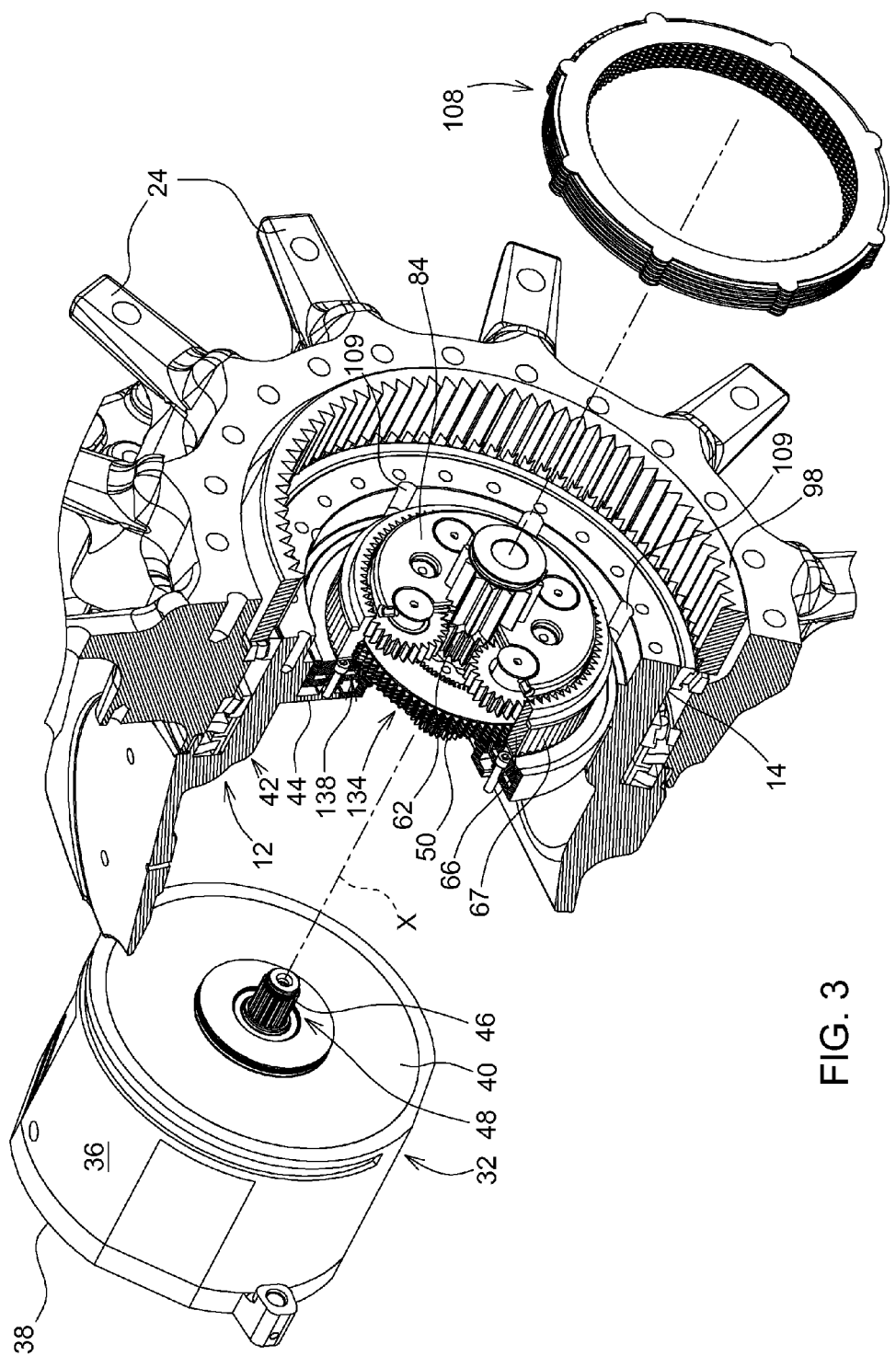
FIG. 3 is a left front perspective view of the drive unit of FIG. 2, but with the tire, rim and some transmission components omitted for clarity and with the electric motor and transmission outer clutch friction disc pack shown exploded.

The drive wheel unit 10 includes a powered drive assembly 30 located centrally within, and coupled for driving, the hub 16. The drive assembly 30 includes an electric motor 32 and a two-speed, multi-stage, planetary gear arrangement 34. Importantly, the drive assembly 30 has a width approximately equal to the width W of the tire 26 so as to not disturb plants grown in rows as the tire 26 travels between the rows of plants Referring also to FIG. 3, it can be seen that the electric motor 32 includes a substantially cylindrical housing 36 having left and right circular end walls 38 and 40, respectively. An axially outer end region of the motor housing 36 is snugly received in an axially inwardly opening, cylindrical cavity 42 formed in the fixed housing 12 in concentric relationship to the rotation axis X and including an annular right end wall 44, with the right end wall 40 of the motor housing 36 abutting the cavity end wall 44. The motor 32 has an output shaft 46 disposed along the axis X and rotatably supported within, and projecting to a location rightward of, the motor housing end wall 40.

Three planetary gear stages comprise the multi-stages of the planetary gear arrangement 34 and are spaced axially rightward along the axis X beginning at the motor housing end wall 40. A first stage sun gear 48 is formed as an integral part of the motor output shaft 46 and is meshed with three first stage planetary gears 50 (most clearly visible in FIGS. 4 and 5) that are, in turn, meshed with a first stage ring gear 52 having an annular vertical flange 54, with the ring gear 52 being secured against rotation by a circular pattern of fasteners (not shown) extending through the flange 54 and into mating threaded holes provided in the right end wall 40 of the motor housing 36. A first stage planet carrier 56 includes three spindles 58 on which the three first stage planetary gears 50 are respectively mounted for rotation.

An intermediate short shaft 60 has a left end received on a reduced diameter right end of the motor output shaft 46 and can rotate relative to the shaft 46. The shaft 60 is externally splined and a left end region of these splines is engaged with a radially inner splined surface of the first stage carrier 56 so that rotation of the carrier 56 is transferred to the shaft 60. Also having a splined connection with the intermediate shaft 60 is a second stage sun gear 62, which, as can best be seen in FIG. 6, rotates with the planet carrier 56 and is meshed with four second stage planetary gears 64, which, in turn, are meshed with a second stage ring gear 66. The second stage ring gear 66 is mounted for rotation relative to the fixed housing 12, but is adapted for being selectively coupled or fixed to the housing, in a manner described below, to change the drive speed of the planetary gear arrangement 34.

Figure 4:
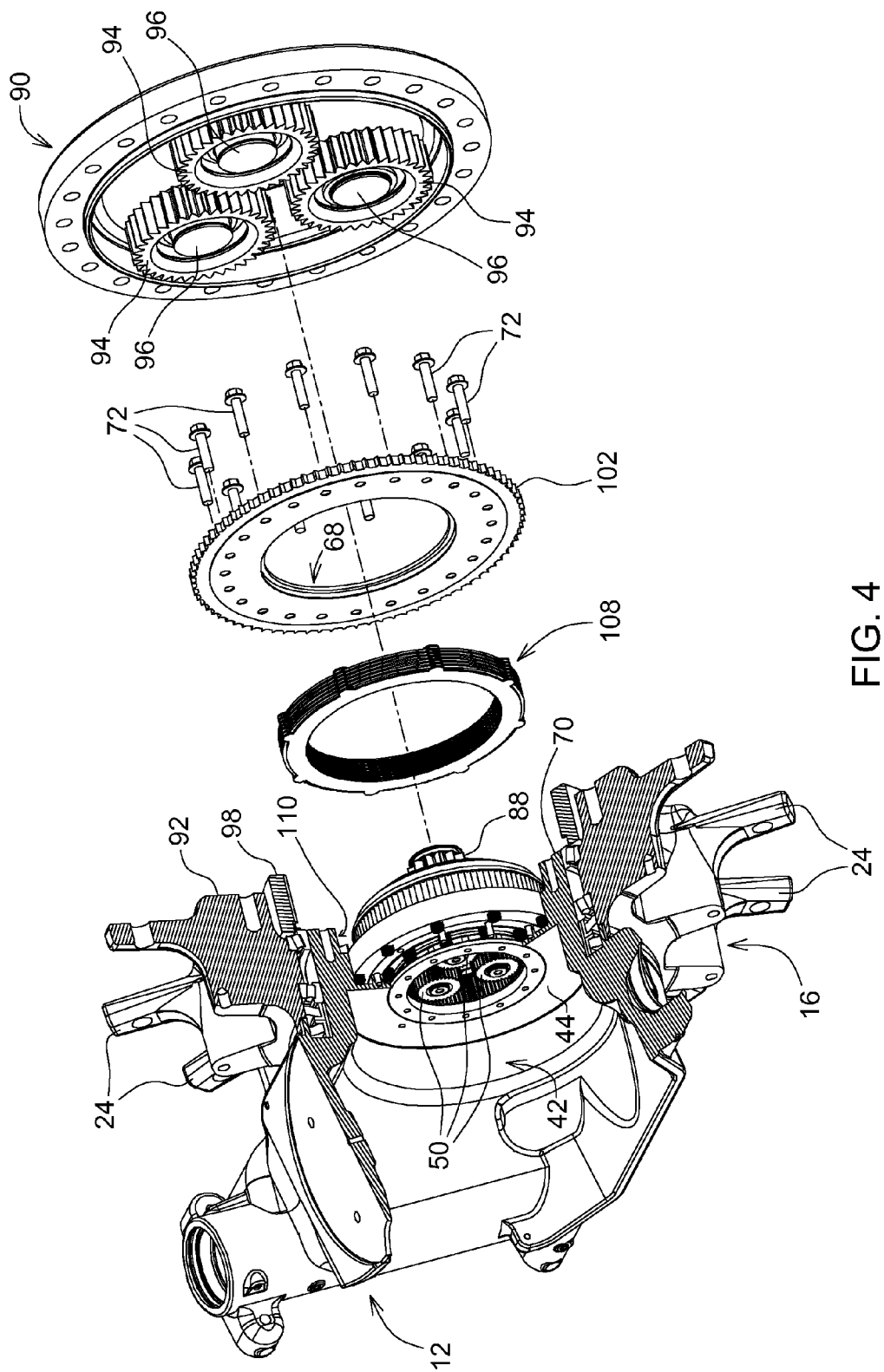
FIG. 4 is a right front perspective view of the drive unit components shown in FIG. 3, but with the electric motor omitted and with the main bearing retaining plate and third stage planetary carrier being included and shown exploded.

Referring also to FIG. 4, it can be seen that axially outward movement of the ring gear 66 is constrained by a flat, annular retainer plate 68 bolted to an annular axially outward facing, outermost end surface 70 of the fixed housing 12 by a plurality of mounting bolts 72, the retainer plate 68 having a radially outer region engaged with an outer surface of the axially outer main bearing 18 and having a stepped, radially inner portion trapping a guide ring 74 between the retainer plate 68 and a shoulder defined by a step formed on an outer circumference of the second stage ring gear 66 at an axially outer region of the ring gear. Inward axial movement of the ring gear 66 is constrained by an annular guide disc or shim 76 loosely sandwiched between an axially inward facing surface of the second stage ring gear 66 and an axially outward facing surface of an annular clutch piston guide member 78. The piston guide member 78 includes an axially inward projecting, annular mounting rib 80 having an axially inward facing annular surface engaged with an axially outward facing annular surface of an axially outward projecting mounting rib 82 of the fixed housing 12, with the guide member 78 being fixed to the spindle housing 12 by a circular pattern of mounting bolts 83 projecting through holes provided in the guide member mounting rib 80 and screwed into aligned threaded holes provided in the housing mounting rib 82.

A second stage planet carrier 84 is provided with spindles 86 on which the planetary gears 64 are respectively mounted for rotation. Further, the carrier 84 has an interiorly toothed, axially outer portion meshed with an axially inner region of teeth of a third stage sun gear 88 formed as an integral part of a short output shaft having axially inner and outer ends respectively supported for rotation in the right end of the intermediate shaft 60 and in a circular end wall or plate defined by a third stage planet carrier 90 and being secured, by a circular arrangement of bolts (not shown) to an axially outward facing annular surface 92 of the wheel mounting hub 16 located radially outward of the main bearings 18. The third stage sun gear 88 is meshed with three, third stage planetary gears 94, which are respectively mounted for rotation about three spindles 96 of the planet carrier 90. The planetary gears 94 are meshed with a third stage ring gear 98, with an axially inner region 100 of each of the teeth of the ring gear 98 being modified and respectively engaged with teeth 102 (see FIG. 4) formed on a radially outer circumference of the retainer plate 68 so as to prevent relative rotation between the ring gear 98 and the fixed housing 12.

Mounted in the housing 12 in surrounding relationship to the entire first planetary stage and in a location for cooperating with the second stage ring gear 66 and carrier 84 are nested, radially inner and outer spring applied hydraulically released (SAHR) disc clutches 104 and 106, respectively.

The outer clutch 104 includes an annular disc pack 108 located in a large diameter section of an annular, stepped diameter cylindrical cavity 110 (see FIG. 6) provided in the spindle housing 12 immediately axially inward of, or just to the left of, the retainer plate 68. The disc pack 108 is located radially outward of the second stage ring gear 66 and includes first and second sets of interleaved friction plates.

The first set of friction plates is fixed against rotation and for this purpose have an outer perimeter including radially projecting, semi-circular tabs spaced equally from each other and mounted for shifting axially in complimentary shaped, axially extending slots 109 provided in a larger diameter section of a stepped diameter cavity 110 of the fixed housing 12. The second set of friction plates are mounted for rotation with the second stage ring gear 66 and for this purpose each have a toothed, radially inner annular surface engaged for sliding along mating teeth 67 formed axially along an outer diameter of the second stage ring gear 66.

Figure 6:
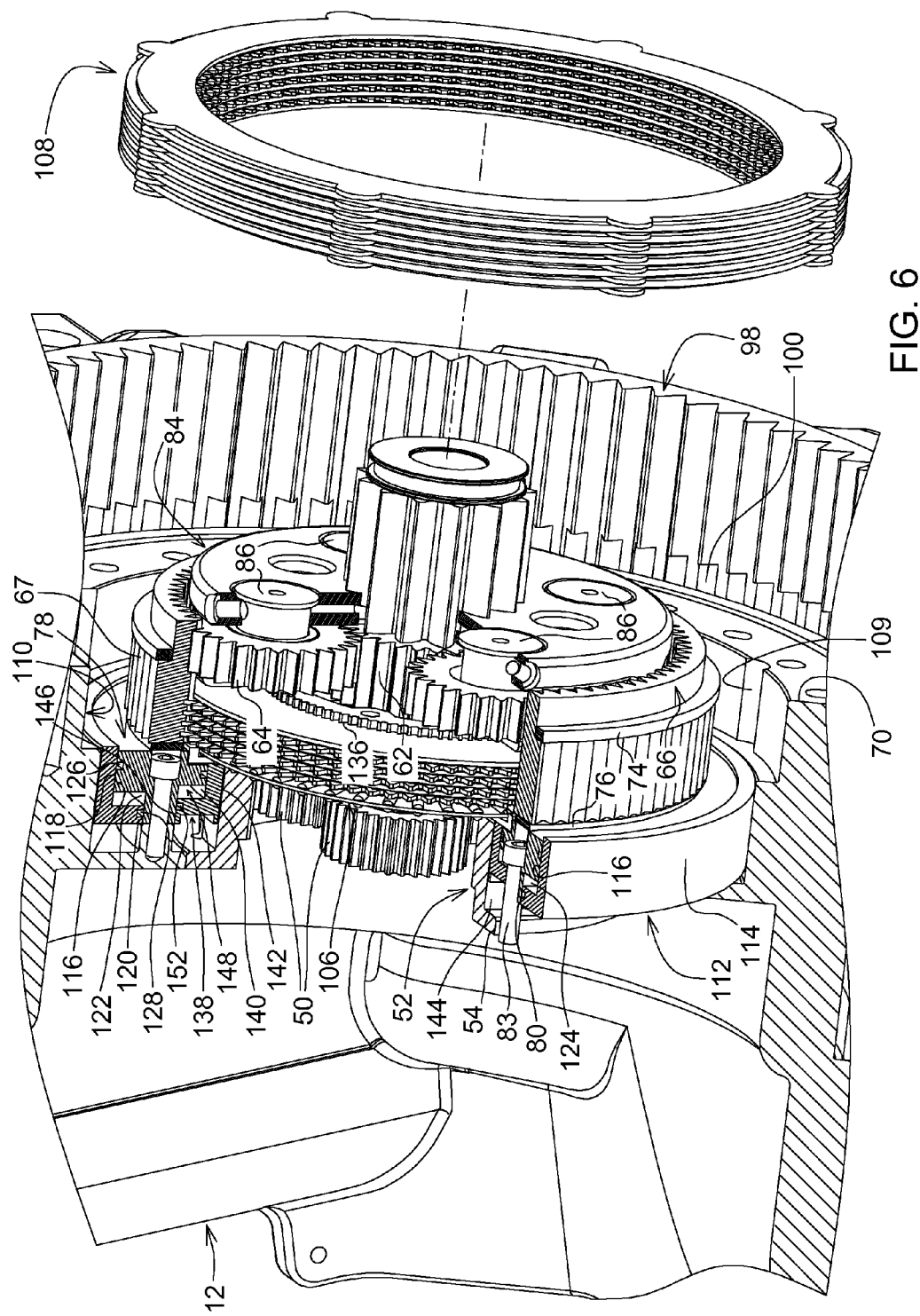
FIG. 6 is an enlarged left front perspective view of the components shown in FIG. 5.

As can best be seen in FIG. 6, the outer clutch 104 further includes an annular outer clutch piston 112 that is L-shaped in cross section with a long leg of the L extending axially and having cylindrical outer and inner surfaces 114 and 116, respectively, with the outer surface 114 being mounted for sliding axially within a smaller diameter section of the stepped diameter cavity 110, and with the inner surface 116 being mounted for sliding axially along an outer cylindrical surface 118 of the clutch piston guide member 78. A short leg of the L extends radially inward from the long leg of the L and defines a relatively narrow inner cylindrical surface 120 mounted for sliding axially along a radially outer cylindrical surface 122 of the mounting rib 80 of the guide member 78. The piston guide member 78 and the piston 112 cooperate to define an annular work fluid cavity 124 that expands and contracts respectively with leftward and rightward movement of the piston 112, as viewed in FIG. 2. A first sealing ring 126 is mounted in an annular groove provided in the outer cylindrical surface 116 of the piston guide member 84 and a second sealing ring 128 is provided in the inner cylindrical surface 118 of the short leg of the L of the piston 112. The first and second sealing rings 126 and 128 thus act to prevent pressure fluid from leaking from the work fluid cavity 124 along the respective interfaces between the piston inner surface 116 and guide member outer surface 118 and between the piston inner surface 120 and guide member outer surface 122.

The outer disc clutch 104, as shown in FIG. 2, is in a disengaged condition wherein fluid pressure in the cavity 124 acts against the radially extending leg of the outer clutch piston 112 so as to hold the piston leftward against the biasing force of a circular array of coil compression springs 130 located in an annular spring cavity 132 formed in the spindle housing 12 adjacent a left end of the annular outer clutch piston 112. In this condition, the interleaved first and second sets of friction plates of the disc pack 108 are not pressed against each other. Thus, the second stage ring gear 72 is free to rotate any time that second stage sun gear 68 is driven. Upon the supply of pressure fluid being disconnected from the work fluid cavity 124, the loaded compression springs 130 will extend axially and act to shift the piston 112 axially outward so as to press the first and second sets of friction plates of the outer annular disc pack 108 together, thereby resulting in the second stage ring gear 66 being fixed to, and prevented from rotating relative to, the spindle housing 12.

The inner disc clutch 106 is constructed in a manner similar to the outer disc clutch 104 and includes an annular disc pack 134 located between an inner diameter of the second stage ring gear 66 and an outer annular surface 136 of the second stage planet carrier 84. The disc pack 134 includes a first set of friction plates interleaved with a second set of friction plates. The first set of friction plates is mounted for rotation with the second stage ring gear 66 and for this purpose each of these plates includes a toothed outer diameter received for sliding axially along mating teeth provided at the inner diameter of the second stage ring gear 66. The second set of friction plates are mounted for rotating with the second stage planet carrier 84 and for this purpose each of these plates has a toothed outer diameter received for sliding axially along a toothed outer annular surface 136 of the second stage planet carrier 84.

Figure 5:
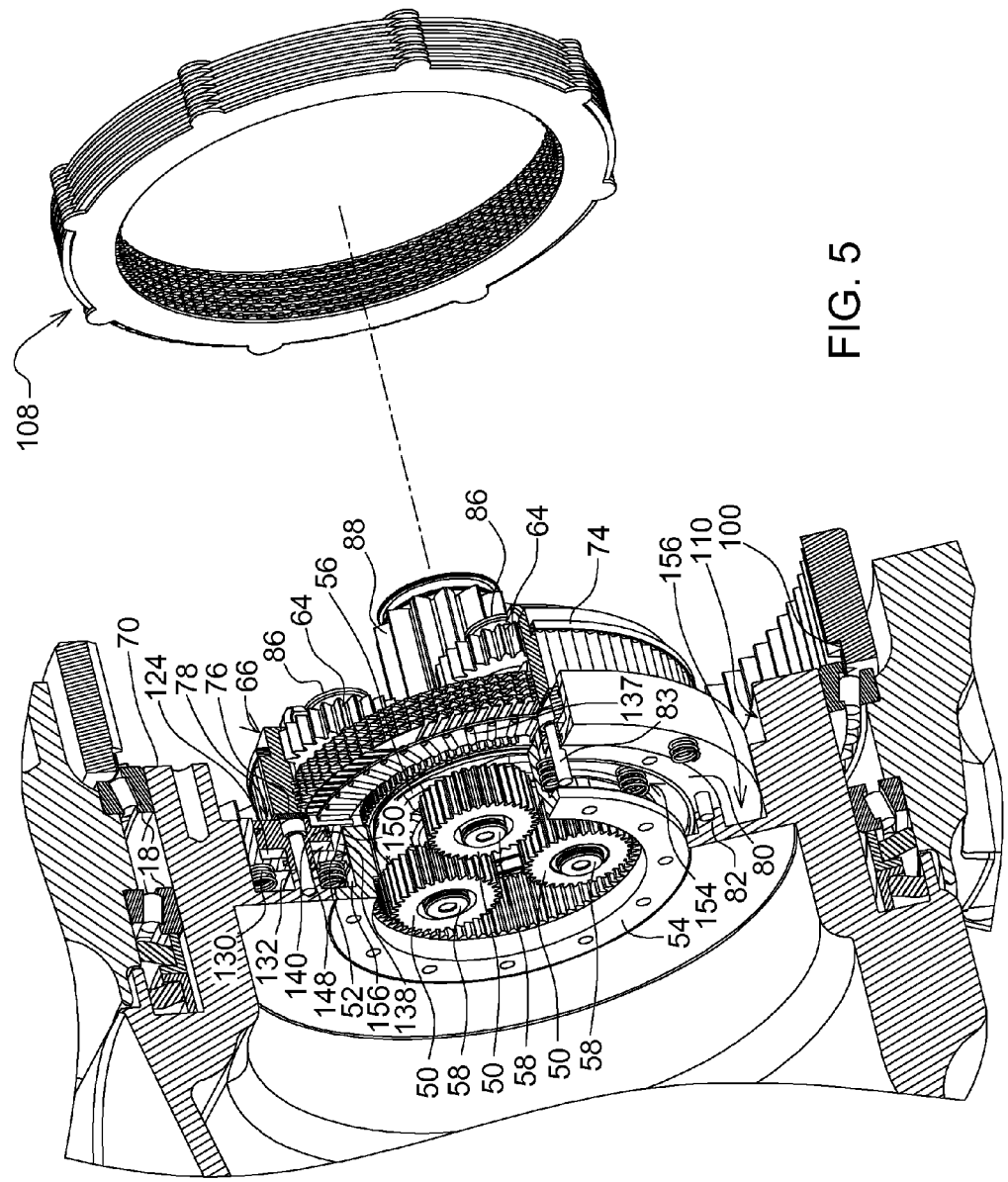
FIG. 5 is an enlarged view of a portion of the structure shown in FIG. 4.

As can best be seen in FIG. 5, an annular thrust bearing 137 having a flat ring construction has an axially inner portion located in an annular step provided in a radially inner location of the piston guide member 78, the bearing 137 having an axially outer face located beside an axially inner friction plate of the inner clutch disc pack 134.

Referring once again to FIGS. 2, 5 and 6, it can be seen that the inner disc clutch 106 further includes an annular clutch piston 138 that is L-shaped in cross section with a long leg of the L extending axially and having cylindrical outer and inner surfaces 140 and 142, respectively, with the outer surface 140 being mounted for sliding axially along an inside diameter of the piston guide member 78 and with the inner surface 142 being mounted for sliding axially along an outer cylindrical surface of the first stage ring gear 52. A short leg of the L extends radially outward from the long leg of the L and defines a relatively narrow outer cylindrical surface 146 mounted for sliding axially along a radially inner cylindrical surface of the mounting rib 80 of the piston guide member 78. The piston guide member 78 and the piston 138 cooperate to define an annular work fluid cavity 148 (FIG. 5) that expands and contracts respectively with leftward and rightward movement of the piston 138, as viewed in FIGS. 1 and 5. A first sealing ring 150 is mounted in an annular groove provided in an inner cylindrical surface of the piston guide member 78 and a second sealing ring 152 is provided in the outer cylindrical surface 146 of the short leg of the L of the piston 138 to prevent pressure fluid from leaking from the work fluid cavity 148 along the interfaces respectively between the piston inner surface 142 and guide member inner surface 142 and between the piston outer surface 146 and inner surface of the mounting rib 80 of the guide member 78.

The inner disc clutch 106 is shown in a disengaged condition in FIG. 2 wherein the clutch piston 138 is held leftward away from the thrust bearing 137 and against the biasing force of a circular array of coil compression springs 154 located in an annular spring cavity 156 formed in part by an annular portion of the spindle housing wall 44 located radially inward of the mounting rib 82 and in part by the annular flange 54 of the first stage ring gear 52. In this condition, the interleaved first and second sets of friction plates of the disc pack 134 are not pressed into engagement with each other to establish a driving connection between the second stage planet carrier 84 and the second stage ring gear 66. Thus, the second stage ring gear 66 is free to be rotated by the second stage planetary gears 64 any time that the second stage sun gear 62 is driven. Upon the supply of pressure fluid being disconnected from the work fluid cavity 124, the loaded compression springs 130 will extend axially and act to press the inner clutch piston 138 axially outward so as to cause the thrust bearing 137 to press the first and second sets of friction plates of the inner annular disc pack 134 together so as to establish a driving connection between the second stage planet carrier 84 and the second stage ring gear 66.

Due to the clutches 104 and 106 acting to selectively couple the second stage ring gear 66 to the fixed housing 12 with all of the ring gears of the three stages thus being coupled to the fixed housing, the planetary gear arrangement 34 will operate without recirculating power losses as is the case when a ring gear free wheels. A related operational benefit of significance is the fact that due to the inner and outer clutches 104 and 106 functioning to turn on and off the second stage of the three stage planetary arrangement, as opposed to turning on and off the first planetary stage, for example, high clutch and sun speeds will occur in the low range, thus taking advantage of the maximum speed of the electric motor 32.

Also of significance is the fact that the inner and outer clutches 104 and 106 are nested radially and that the piston guide member 78 comprises a sealing part which is common to both clutches to allow complex machining operations to be performed on this smaller, robust part rather than on two parts or on a large housing.

Having described one or more example embodiments, it will become apparent that various modifications can be made without departing from the scope of the accompanying claims.

What is claimed is:

1. A drive wheel unit for use with a vehicle intended for operation wherein a pair of the drive wheel units are driven between rows of plants separated from each other by a predetermined distance as narrow as 20 inches (508 mm), with the wheel units including a circular rim carrying a tire rotatable about a central rotation axis and having an axial width which does not exceed said predetermined distance, the drive wheel unit comprising:

a fixed housing located along said central rotation axis and having an outer cylindrical surface arrangement configured for, and carrying, a pair of roller thrust bearings in axial alignment with each other along said rotation axis, the housing further including an internal cavity arrangement configured for, and receiving, a drive motor having an output shaft located along said central rotation axis and coupled to a first stage of a two-speed, three stage planetary gear arrangement;

a wheel mounting hub being supported for rotation about said outer cylindrical surface of said fixed housing by said pair of roller thrust bearings and said planetary gear arrangement having a third stage planet carrier mounted to said hub and serving as a cap for said hub and for said planetary transmission arrangement;

said pair of roller thrust bearings being of a relative large diameter and encircling said first and second stages of said planetary transmission arrangement; and said drive motor including a housing with an axial distance between an axially inner surface of said housing and an axially outer surface of said hub being approximately equal to said axial width of said tire.

2. The drive wheel unit, as set forth in claim 1, wherein said pair of roller thrust bearings also encircle radially nested inner and outer hydraulically operable disc clutches respectively having outer and inner disc packs, with the outer disc pack being coupled between the fixed housing and an outer circumference of a second stage ring gear and being selectively engaged for fixing a second stage ring gear to the fixed housing, and with the inner disc pack being coupled between an inner circumference of the second stage ring gear and an outer circumference of the first stage planet carrier and being selectively engaged for fixing the second stage ring gear for rotation with the first stage planet carrier.

3. The drive wheel unit, as defined in claim 2, wherein said inner and outer hydraulic disc clutches are each spring-applied, hydraulically released clutches.

4. The drive wheel unit, as set forth in claim 2, wherein said outer and inner hydraulically operable disc clutches respectively include annular, outer and inner hydraulic pistons; an annular piston guide member being located between said outer and inner hydraulic pistons and being fixed to said fixed housing; said annular piston guide member including a radially outer surface engaged with said outer hydraulic piston and acting to guide said outer hydraulic piston as it shifts axially for selectively effecting engagement of said outer disc pack, and said annular piston guide member including a radially inner surface engaged with said inner hydraulic piston and acting to guide said inner hydraulic piston as it shifts axially for selectively effecting engagement of said inner disc pack.

5. The drive wheel unit, as set forth in claim 4, wherein said piston guide member has an annular mounting rib at one end defining first radially outer and inner surface regions, and said piston guide member further including second radially outer and inner surface regions stepped respectively radially outward and radially inward from said first radially outer and inner surface regions, and wherein said outer and inner hydraulic pistons each include an axially extending first leg and a radially extending second leg thereby defining an L-shaped cross section, with the first leg of the outer piston having an inner surface extending parallel to, and being in sliding engagement with, said second radially outer surface region of said piston guide member, and with the second leg of the outer hydraulic piston having an end slidably engaged with the first radially outer region of the piston guide member, whereby an outer annular work fluid cavity is formed between the outer hydraulic piston and the piston guide member, and with the first leg of the inner piston extending parallel to, and being in sliding engagement with, the second radially inner surface region of the piston guide member and with the second leg of the inner piston having an end in sliding engagement with the first radially inner region of the piston guide member, whereby an inner annular work fluid cavity is formed between the inner hydraulic piston and the piston guide member.

6. The drive wheel unit, as defined in claim 2, wherein said fixed housing has an axially outermost, planar annular end surface; an annular retaining plate being fixed against said planar annular end surface of the housing and extending radially beside one of said pair of roller thrust bearings so as to retain it in place on said fixed housing.

7. The drive wheel unit, as defined in claim 6, wherein said annular retaining plate has a toothed outer perimeter; and a third stage ring gear having an axially inner interior region provided with teeth engaged with those of the retaining plate, whereby said third stage ring gear is fixed to said fixed housing by said retainer plate.

8. The drive wheel unit, as defined in claim 2, wherein said fixed housing has an axially outermost, planar annular end surface; an annular retaining plate being fixed against said planar annular end surface of the housing and extending radially beside one of said pair of roller thrust bearings so as to retain it in place on said fixed housing; and said outer disc pack being located immediately axially inward of said annular retaining plate.

9. The drive wheel unit, as defined in claim 8, wherein said annular retaining plate includes a radially inner annular end region provided with a step defining an annular shoulder disposed in axial opposition to a shoulder located on the second stage ring gear, whereby the retaining plate serves to prevent axial outward movement of the outer disc pack relative to said second stage ring gear.

10. The drive wheel unit, as defined in claim 4, wherein said fixed housing has an axially outermost, planar annular end surface; a planar, annular retaining plate being fixed against said planar annular surface of the housing and extending radially beside one of said pair of roller thrust bearings so as to retain it in place on said fixed housing; and wherein said second stage ring gear is located between, and is axially captured by, said piston guide member and said annular retaining plate.

11. The drive wheel unit, as defined in claim 10, wherein a third stage ring gear axially overlaps and encircles a portion of an inner race of said one of said pair of roller thrust bearings and a portion of the second stage sun gear, second stage planet carrier and planetary gears; and said annular retaining plate having a toothed outer periphery engaged with mating teeth provide on said third stage ring gear so as to secure it to said fixed housing.

12. A drive wheel unit, comprising: a fixed housing; a power unit mounted within an axially inner region of a cavity in said fixed housing and having an output shaft extending axially outward along a rotation axis;
   a wheel hub including a central opening receiving a cylindrical outer surface of said fixed housing and being mounted for rotation about said axis by first and second roller thrust bearings spaced axially from each other along, and having inner races fixed to the cylindrical outer surface of said fixed housing, and having outer races located in the central opening of the hub, with said inner race of the second roller thrust bearing being located at an extreme axial outer end of said housing, and with said hub including a removable cap secured at an axially outer surface of said hub;
   a rim carrying a tire and being fixed for rotation with said hub, with said tire encircling said power unit and hub and having a width dimension approximately equal to a distance between an axial inner surface of said power unit and an axially outer surface of said hub which is located axially inward of the axially outer surface of the hub;
   a planar retainer plate being fixed to said extreme axially outer end of said housing and being in engagement with said inner race of said second roller thrust bearing;
   a two-speed, three stage planetary gear arrangement being located in an axially outer region of said cavity extending axially from said power unit to, and including, said hub, with said hub defining a third stage planet carrier;
   said power unit output shaft having a first stage sun gear fixed to it, a first stage planet carrier carrying first stage planet gears meshed with said first stage sun gear and with a first stage ring gear, with said first stage ring gear being fixed to said fixed housing;
   said first stage carrier defining an intermediate shaft located along said rotation axis immediately at an axially outer end of said power unit output shaft; a second stage sun gear being fixed for rotation with the intermediate shaft; a second stage planet carrier carrying second stage planet gears meshed with the second stage sun gear and a second stage ring gear, with the second stage planet gears being located substantially coplanar with said retainer plate;
   an output shaft of said planetary gear arrangement being located immediately axially outward of the intermediate shaft; a third stage sun gear being mounted for rotating with this last named output shaft; said third stage planet carrier carrying third stage planet gears meshed with said third stage sun gear and meshed with a third stage ring gear partly surrounding the inner race of the second roller thrust bearing and surrounding and being coupled to an outer surface of the retainer plate with the third stage ring gear thus being fixed to the fixed housing; and
   radially outer and inner hydraulically operated disc clutches respectively having outer and inner disc packs located on opposite outer and inner sides of said second stage ring gear, with said outer disc pack being coupled between an outer annular surface of said second stage ring gear and said housing at a location immediately axially inward of the retainer plate, and with said inner disc pack being coupled between an inner annular surface of said second stage ring gear and an outer annular surface of said first stage carrier.

13. The drive wheel unit, as defined in claim 12, and further including an annular piston guide member secured to said fixed housing and including stepped radially outer and inner surfaces; said radially outer disc clutch including a piston having a stepped inner surface in sealed engagement with, and cooperating with, said stepped radially outer surface of said annular piston guide member so as to define an outer pressure fluid cavity for selectively receiving pressurized fluid for effecting operation of said outer disc clutch; and said radially inner disc clutch including an inner clutch piston having a radially outer stepped surface in sealed engagement with, and cooperating with said stepped radially inner surface of said guide member so as to define an inner pressure fluid cavity for selectively receiving pressurized fluid for effecting operation of said inner disc clutch.

14. The drive wheel unit, as defined in claim 13, wherein said inner and outer disc clutches are each spring applied, hydraulically released disc clutches.

15. The drive wheel unit, as defined in claim 13, wherein said piston guide member includes an annular mounting rib projecting axially away from said inner and outer disc packs; and said annular mounting rib having radially outer and inner surfaces respectively defining a portion of said stepped radially outer and inner surfaces.

16. The drive wheel unit, as defined in claim 15, wherein said inner and outer disc clutches are each spring applied, hydraulically released clutches; said fixed housing having an annular rib projecting axially toward and engaging said annular rib of said piston guide member; and said outer and inner clutches respectively including radially outer and inner annular arrays of coil compression springs located on opposite sides of said annular rib of said fixed housing and being compressed between said fixed housing and said outer and inner pistons, whereby introduction of pressure fluid into said outer cavity will disengage the outer clutch and introduction of pressure fluid into said inner cavity will disengage the inner clutch.

17. The drive wheel unit, as defined in claim 12, wherein the tire of the drive wheel unit has an axial width of between 16 and 17 inches and is adapted for traveling between adjacent crop rows spaced approximately 20 inches from each other.

* * * * *